United States Patent
Nagasaka et al.

(10) Patent No.: US 11,278,973 B2
(45) Date of Patent: Mar. 22, 2022

(54) RECHARGEABLE SHEAR

(71) Applicant: MAKITA CORPORATION, Anjo (JP)

(72) Inventors: Hidenori Nagasaka, Anjo (JP); Shogo Tominaga, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/591,230

(22) Filed: Oct. 2, 2019

(65) Prior Publication Data
US 2020/0139459 A1   May 7, 2020

(30) Foreign Application Priority Data

Nov. 1, 2018  (JP) .............................. JP2018-206793

(51) Int. Cl.
*B23D 27/04*  (2006.01)
*B26B 15/00*  (2006.01)
*B25F 5/02*  (2006.01)

(52) U.S. Cl.
CPC ............... *B23D 27/04* (2013.01); *B25F 5/02* (2013.01); *B26B 15/00* (2013.01)

(58) Field of Classification Search
CPC ............ B23D 27/04; B25F 5/02; B26B 15/00
USPC .......................... 30/228, 229, 134, 166.3, 194
See application file for complete search history.

(56) References Cited

U.S. PATENT DOCUMENTS

| | | | | |
|---|---|---|---|---|
| 9,764,486 B2 * | 9/2017 | Bublitz | ...................... | B25F 5/02 |
| 10,343,227 B2 * | 7/2019 | Frenken | .................. | B23D 17/02 |
| 10,780,593 B2 * | 9/2020 | Sandefur | ................. | A01G 3/037 |
| 2003/0163921 A1 * | 9/2003 | Tsai | ......................... | B26B 15/00 30/146 |
| 2009/0241351 A1 * | 10/2009 | Maniwa | .................. | A01G 3/037 30/228 |
| 2019/0308255 A1 * | 10/2019 | Wason | ..................... | B25F 5/005 |

OTHER PUBLICATIONS

Makita Instruction Manual for Cement Shear Product No. JS8000, available to public at least as early as 2014.
Makita Instruction Manual for Cordless Metal Shear Product No. XSJ01, available to public at least as early as 2014.
pp. 36 and 37 of Makita General Catalogue 2014 showing Cordless Metal Shear Product No. DJS130.
Parts Breakdown for Cement Shear Product No. JS8000, available to public at least as early as 2014.
Parts Breakdown for Cordless Metal Shear Product No. XSJ01, available to public at least as early as 2014.

* cited by examiner

*Primary Examiner* — Omar Flores Sanchez
(74) *Attorney, Agent, or Firm* — J-Tek Law PLLC; Jeffrey D. Tekanic; Mark A. Ussai

(57) ABSTRACT

A rechargeable shear (1) includes: a motor (5) having a rotor (21) that is rotatable relative to a stator (20); a motor housing (4), which houses the motor (5); a grip housing (8) connected to the motor housing (4); a battery-holding housing (9) connected to the grip housing (8); and a shear part (3) disposed forward of the rotor 21 and operably driven by the rotor (21). The motor (5) may be brushless. The shear part (3) may be rotatable relative to the motor housing (4) using a manipulatable ring (85) and a detent system (89, 92-94). A light (48) for illuminating the shear part (3) and a workpiece being cut thereby may be provided on the grip housing (8) or the battery-holding housing (9).

20 Claims, 16 Drawing Sheets

FIG.3

RECHARGEABLE SHEAR

CROSS-REFERENCE

The present application claims priority to Japanese patent application serial number 2018-206793 filed on Nov. 1, 2018, the contents of which are incorporated fully herein by reference.

TECHNICAL FIELD

The present invention generally relates to a rechargeable (cordless) shear that is used to cut a workpiece such as an air-conditioning duct, a roofing material, a cement board, or the like.

BACKGROUND ART

Known electrically-powered shears include a shear part/head (cutting head assembly) that is provided at the tip of a housing and is driven by an electric motor. Such electrically-powered shears can be used to cut materials such as an air-conditioning duct, a roofing material (shingle), a cement board, or the like.

For example, the present Applicant (Makita Corporation) has sold electrically-powered shears under product numbers JS8000 and DJS130 (XSJ01Z). JS8000 is a corded (AC-driven) shear, whereas DJS130 (XSJ01Z) is a cordless shear driven by a rechargeable battery pack. Both JS8000 and DJS130 (XSJ01Z) have brushed motors. DJS130 (XSJ01Z) has a 360 degree swivel shear head.

SUMMARY OF THE INVENTION

It is one non-limiting object of the present teachings to provide a rechargeable shear having improved ergonomics and/or a higher power output.

In one aspect of the present teachings, a rechargeable (cordless) shear preferably comprises: a brushless motor having a stator and a rotor, which is rotatable relative to the stator; a motor housing, which houses the brushless motor; a grip housing, which is connected to the motor housing; a battery-holding housing, which is connected to the grip housing; and a shear part, which is disposed forward of the rotor and performs a shearing operation by being driven by the rotor.

In another aspect of the present teachings, a rechargeable (cordless) shear preferably comprises: a housing; a motor having a stator and a rotor, which is rotatable relative to the stator; and a shear part, which is disposed forward of the rotor and performs a shearing operation by being driven by the rotor. The housing comprises a motor housing, which houses the motor, a grip housing, which is connected to the motor housing, and a battery-holding housing, which is connected to the grip housing. A light for illuminating the shear part is provided on the housing.

The grip housing optionally may have a loop shape that extends in the up-down direction and a lower end of which is located downward of the motor housing. In such an embodiment, the light may be provided on an upper surface of the grip housing.

In the alternative, the battery-holding housing may be provided on a lower end of the grip housing and the light may be provided on an upper surface of the battery-holding housing.

In any of the above-mentioned embodiments, the shear part may be rotatable about a front-rear extending axis relative to the housing and may be provided such that it is capable of being fixed at an arbitrary rotational position relative to the housing, more particularly at a plurality of different rotational positions (corresponding to engaging recesses formed in a manually-rotatable ring) relative to the housing.

Additional objects, aspects, embodiments and advantages of the present disclosure will become apparent upon reading the following detailed description in view of the appended drawings and claims.

BRIEF DESCRIPTION OF THE DRAWINGS

FIG. 3 is a side view, viewed from the right, of the rechargeable shear according to the first embodiment.

DETAILED DESCRIPTION OF EMBODIMENTS

Embodiments of the present disclosure will be explained below, with reference to the drawings.

First Embodiment

Figure 1:
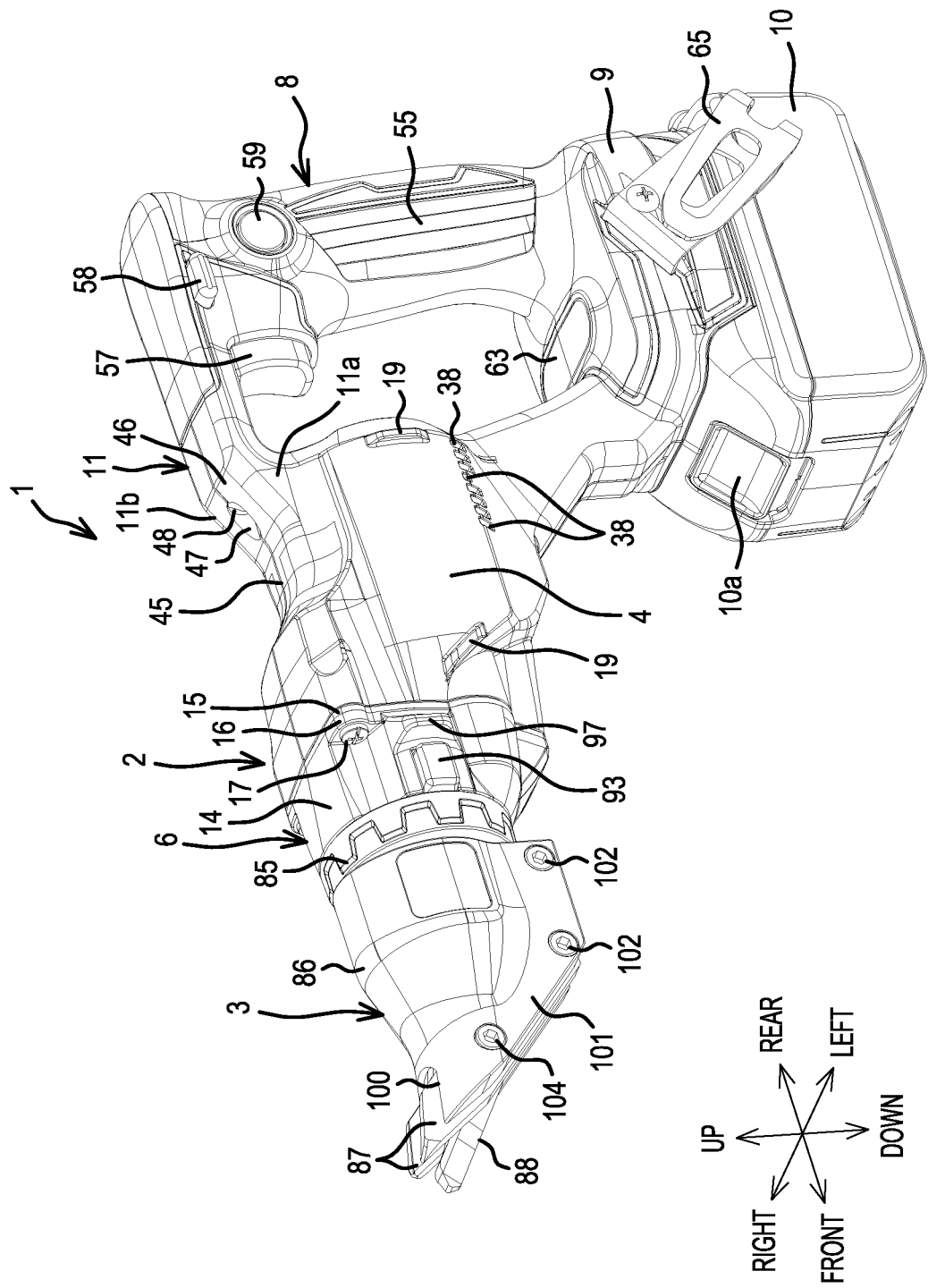
FIG. 1 is an oblique view, viewed from the front left side, of a rechargeable shear according to a first embodiment.
Figure 2:
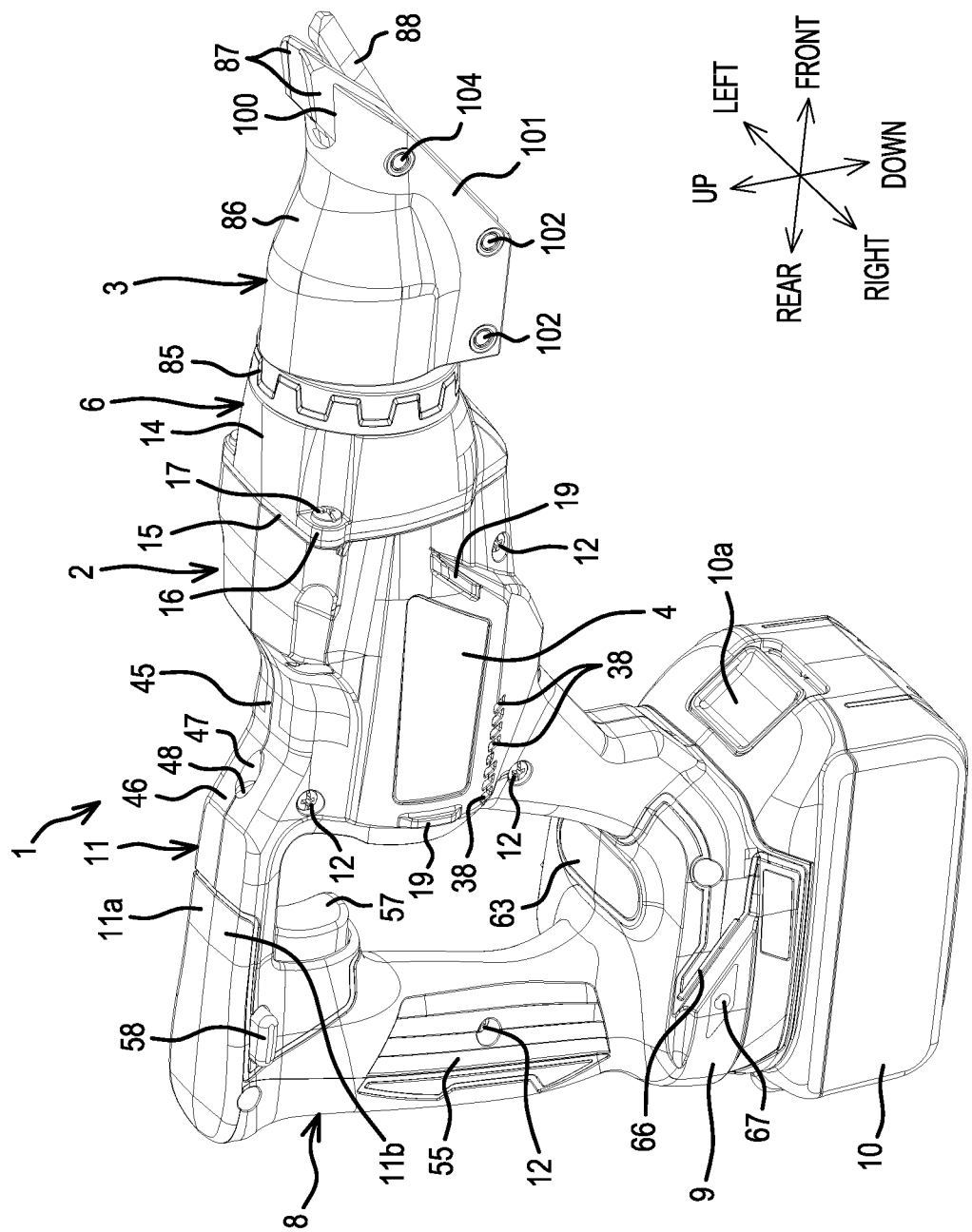
FIG. 2 is an oblique view, viewed from the front right side, of the rechargeable shear according to the first embodiment.
Figure 3:
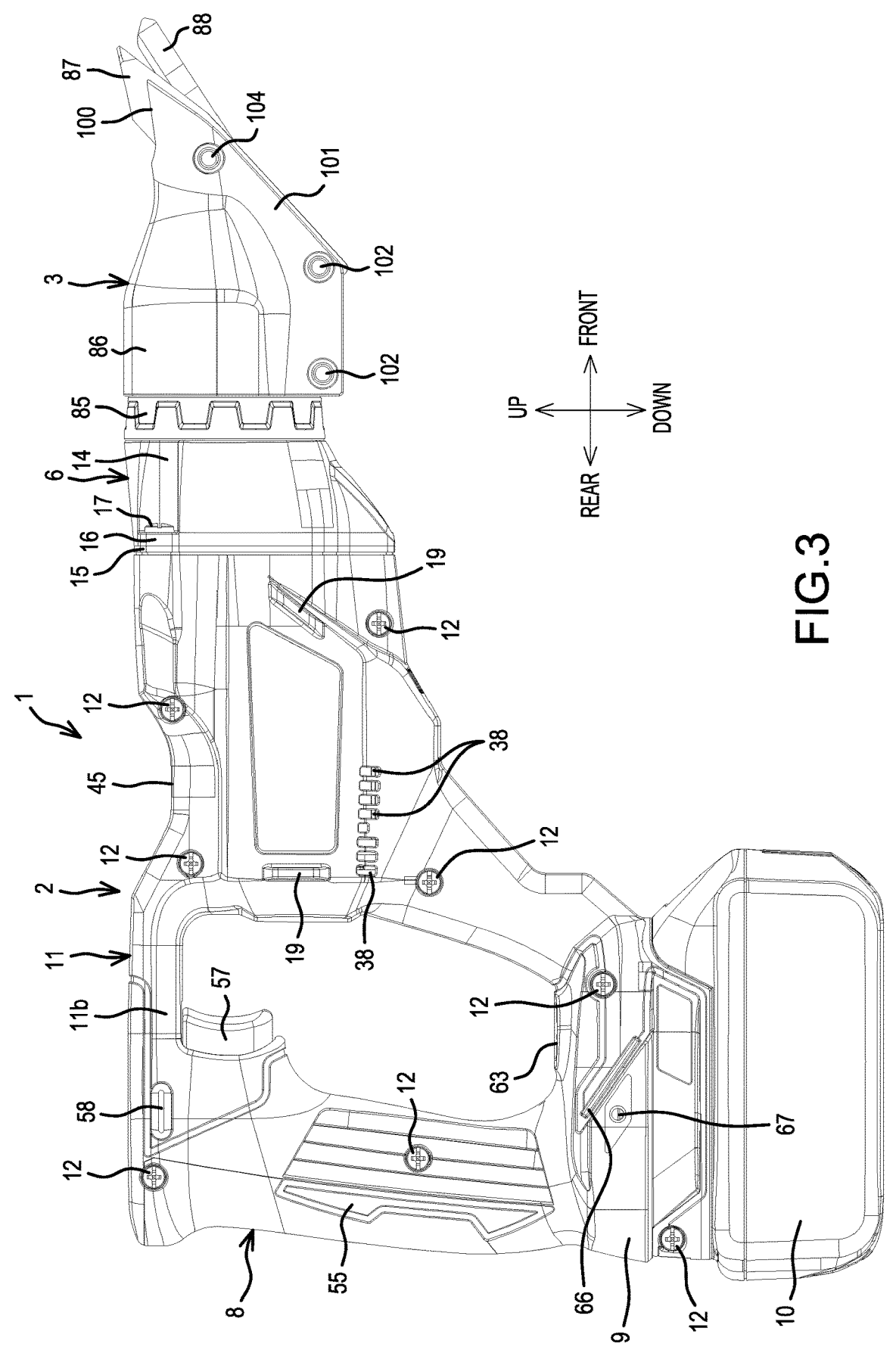
Figure 4:
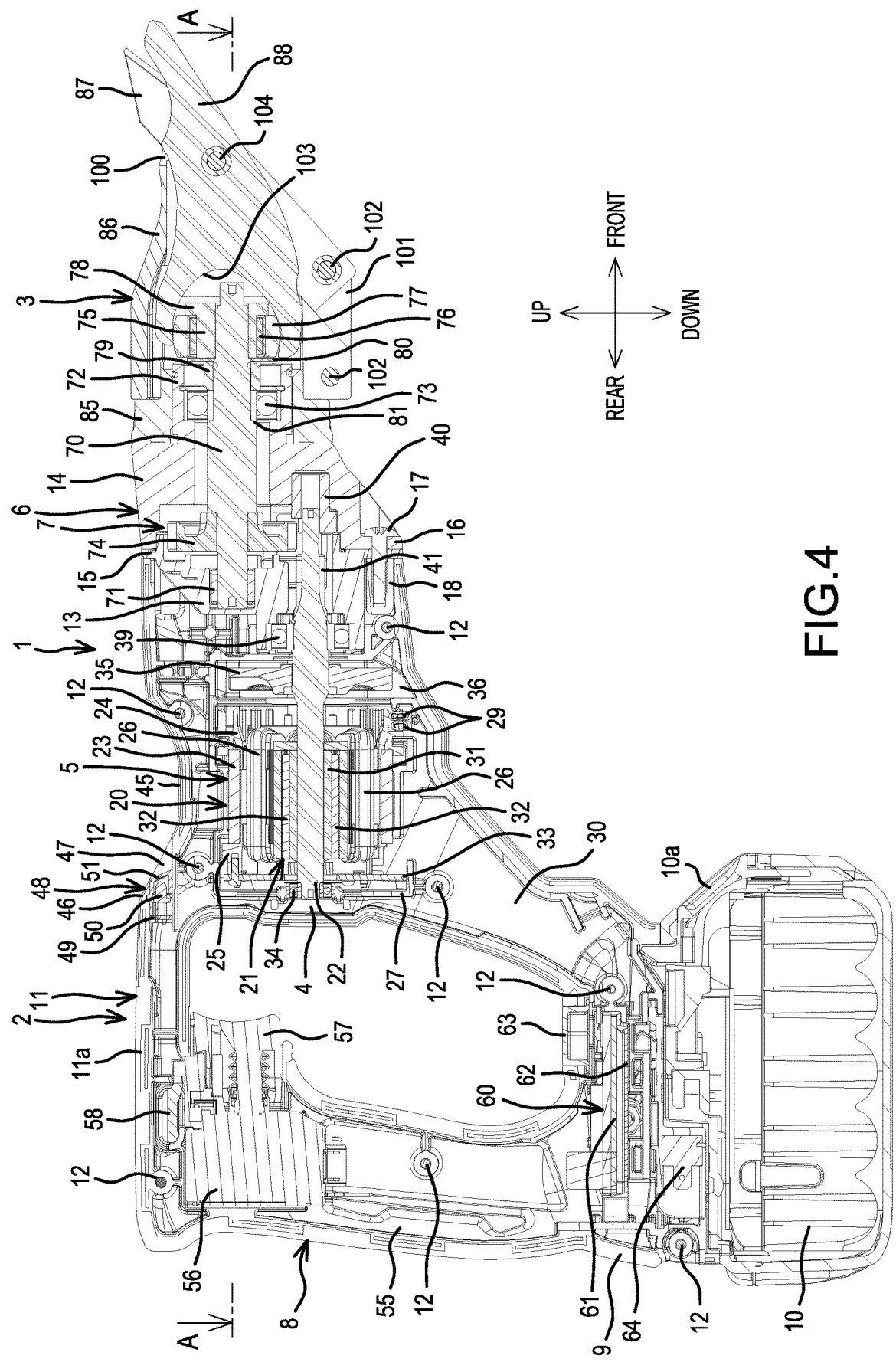
FIG. 4 is a center longitudinal-cross-sectional view of the rechargeable shear according to the first embodiment.

FIGS. 1 and 2 are oblique views that show one representative, non-limiting example of a rechargeable shear 1 according to the present teachings; FIG. 3 is a side view, viewed from the right; FIG. 4 is a center longitudinal-cross-sectional view; and FIG. 5 is a cross-sectional view taken along line A-A in FIG. 4.

Referring first to FIGS. 1-3, the rechargeable (cordless) shear 1 of the first embodiment comprises a shear part 3, which is configured to perform a shearing (cutting) operation and is located at a front end of a housing 2. The shear part 3 also may be referred to, in an interchangeable manner, as a shear head, a cutting head assembly or scissors. The housing 2 generally extends in a front-rear direction of the shear 1. The housing 2 comprises: a motor housing 4, which houses a brushless motor 5; a gear housing 6, which is connected to the front of the motor housing 4 and houses a speed-reducing part 7; a grip housing 8, which is connected in a loop shape (a D shape) to the rear of the motor housing 4 and whose lower end protrudes downward of the motor housing 4; and a battery-holding housing (battery mount part) 9, which is connected to a lower end of the grip housing 8. A battery pack 10 is mounted, by sliding from the front, on the battery-holding housing 9. The battery pack 10 can be removed by pressing in a button 10a.

The motor housing 4, the grip housing 8, and the battery-holding housing 9 are formed integrally with a main body housing 11. More specifically, a pair of (left and right) half housings 11a, 11b are assembled (joined) by screws 12 that extend in the left-right direction. The gear housing 6 comprises an inner housing 13 (see FIGS. 4-6), which is housed in a front-end inner part of the main body housing 11, and an outer housing 14, which is exposed forward of the main body housing 11. The gear housing 6 is assembled onto (joined to) the main body housing 11 by: securing a rear flange 15, which is formed on a front outer circumference of the inner housing 13, to a front end of the main body housing 11; from the front thereof, overlaying a front flange 16, which is formed on a rear end of the outer housing 14; and screwing screws 17, which are inserted through both of the flanges 15, 16 from the front, into respective screw bosses 18, which are provided on an inner circumference of the main body housing 11. Ridges 19 are formed on both the front and rear sides on the left and right side surfaces of the motor housing 4 and are oriented in an up-down direction. These ridges 19 protect the motor housing 4 when the shear 1 is placed (laid) on its side, such as when it is placed (laid) on the ground.

Figure 5:
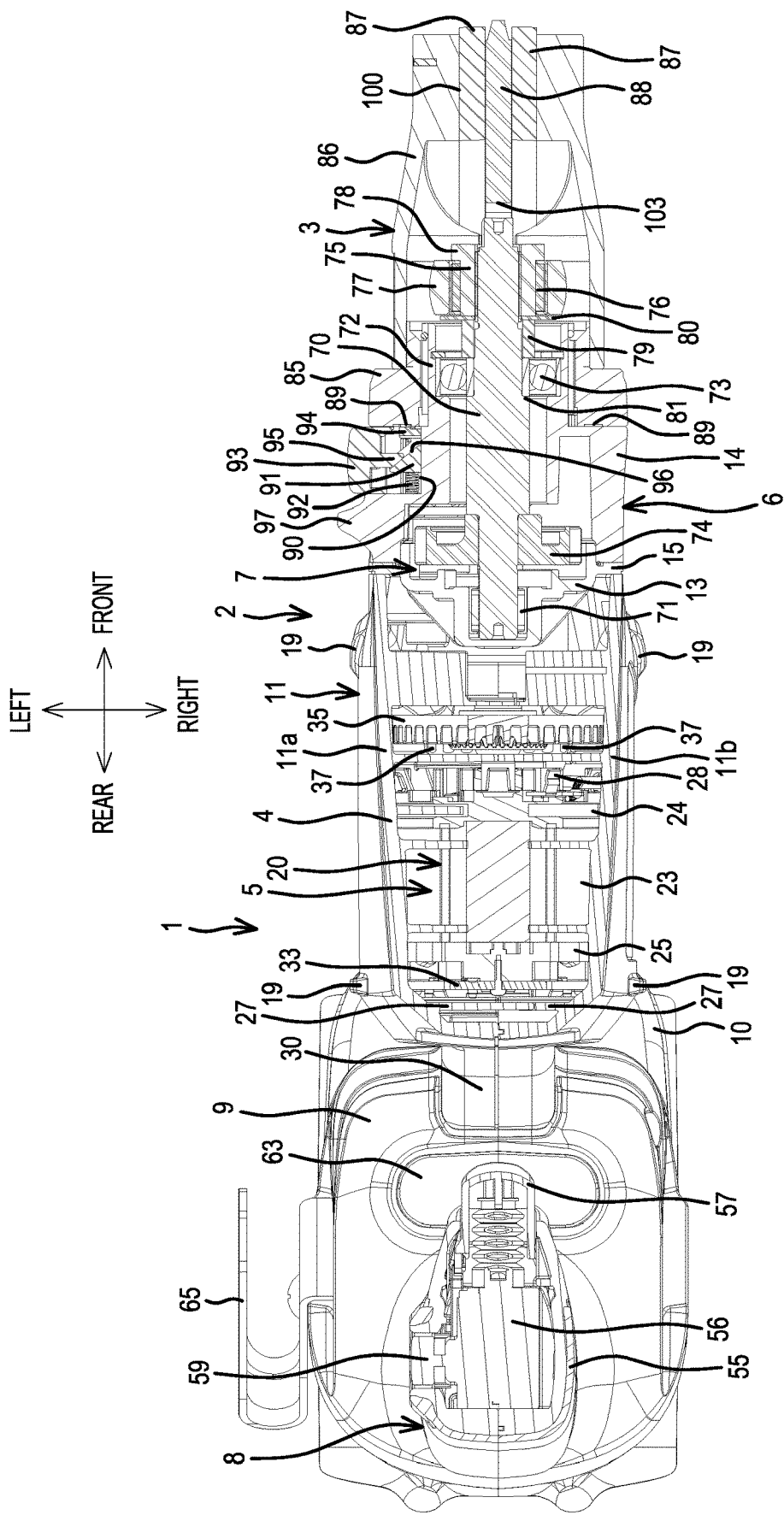
FIG. 5 is a cross-sectional view taken along line A-A in FIG. 4.
Figure 6:
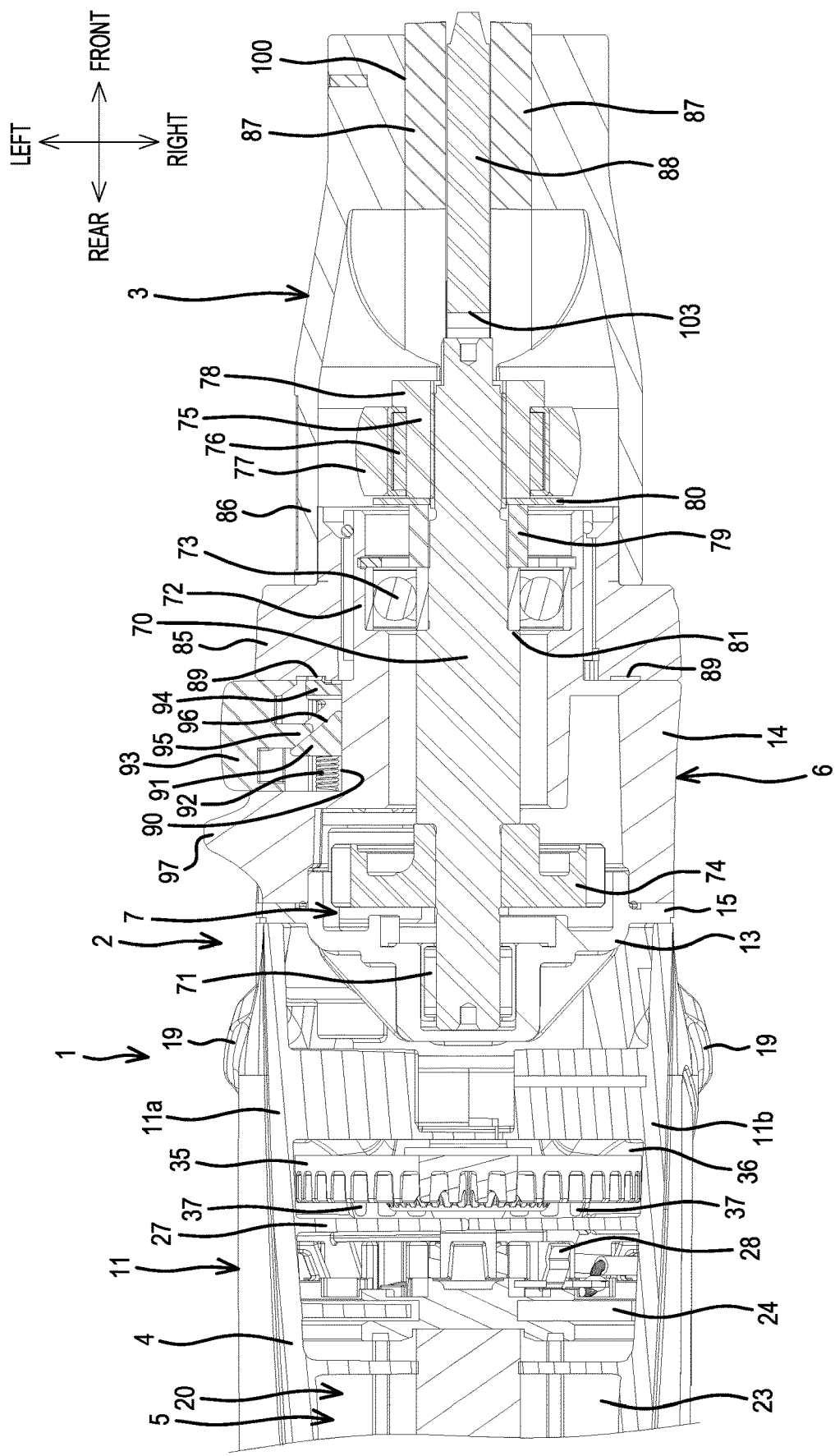
FIG. 6 is an enlarged view of a front-side portion shown in FIG. 5.
Figure 7:
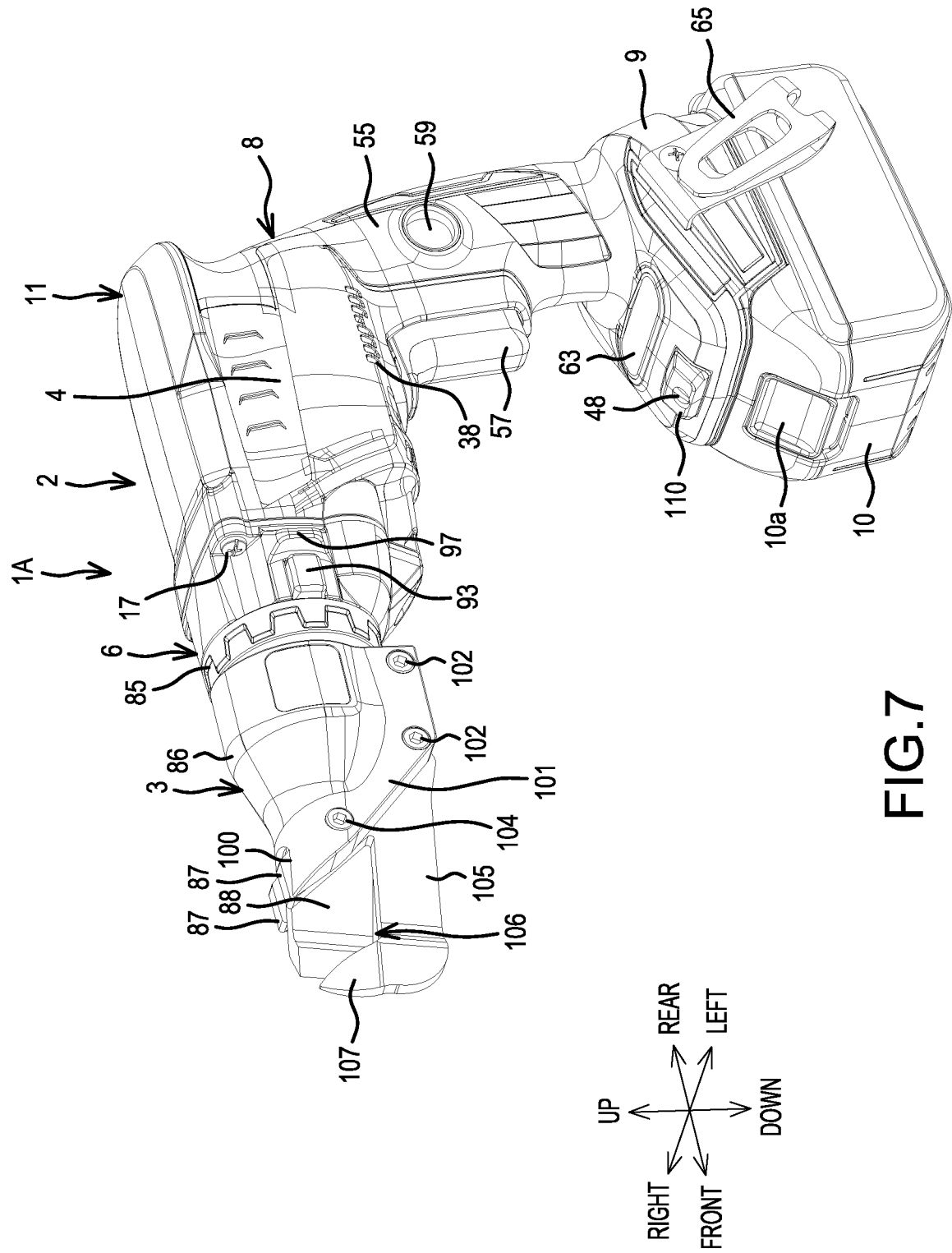
FIG. 7 is an oblique view, viewed from the front left side, of the rechargeable shear according to a second embodiment.
Figure 8:
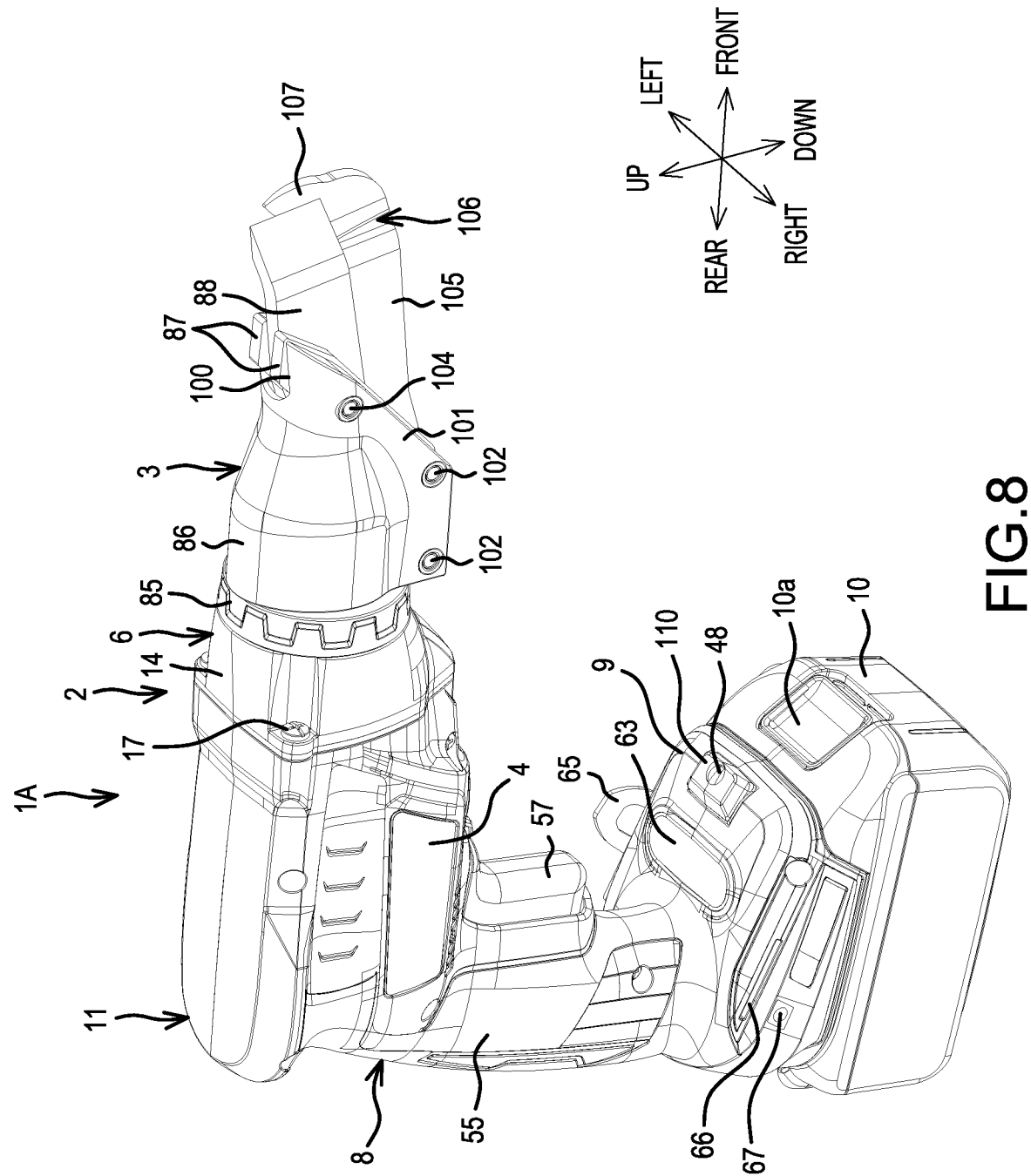
FIG. 8 is an oblique view, viewed from the front right side, of the rechargeable shear according to the second embodiment.
Figure 9:
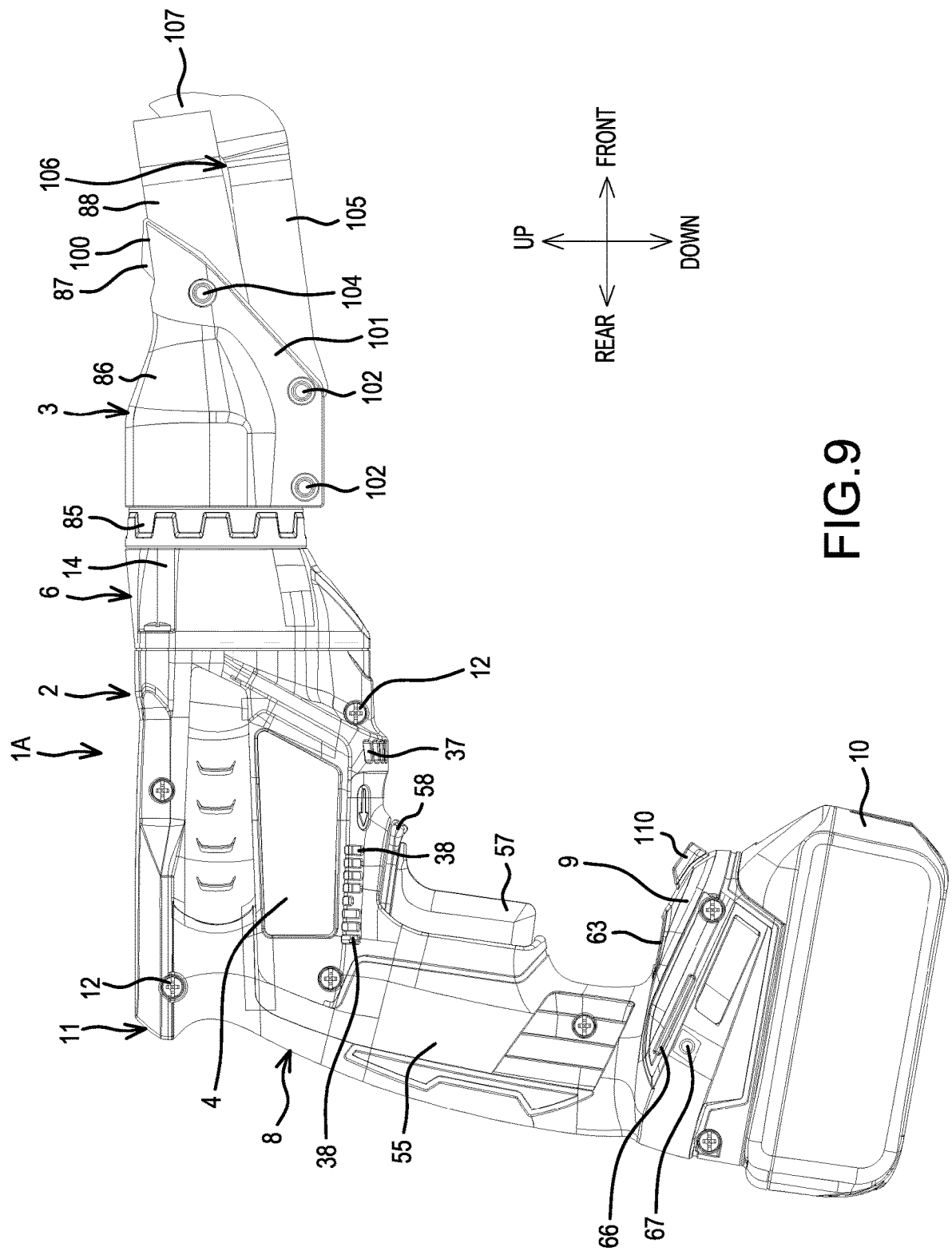
FIG. 9 is a side view, viewed from the right, of the rechargeable shear according to the second embodiment.
Figure 10:
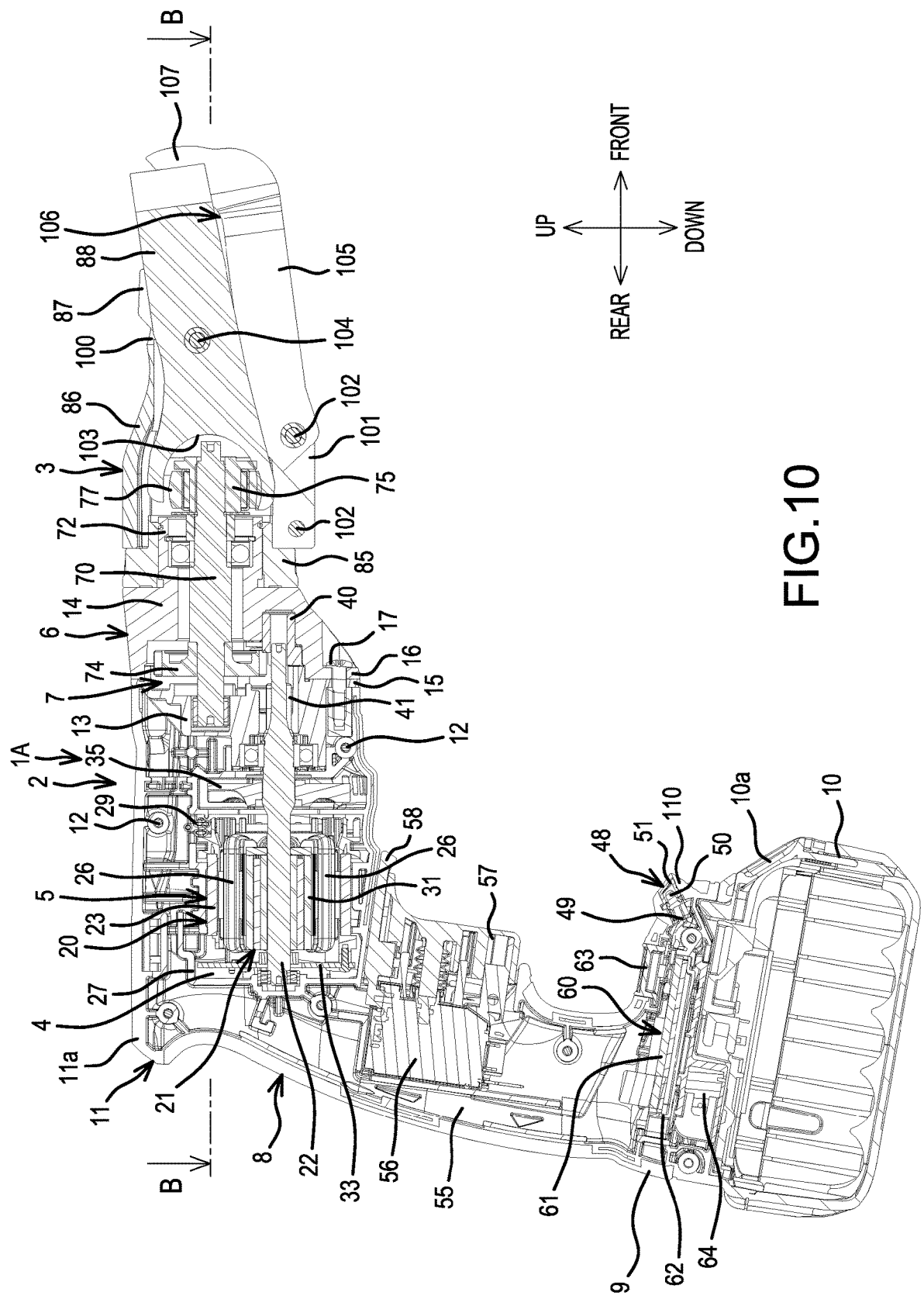
FIG. 10 is a center longitudinal-cross-sectional view of the rechargeable shear according to the second embodiment.
Figure 11:
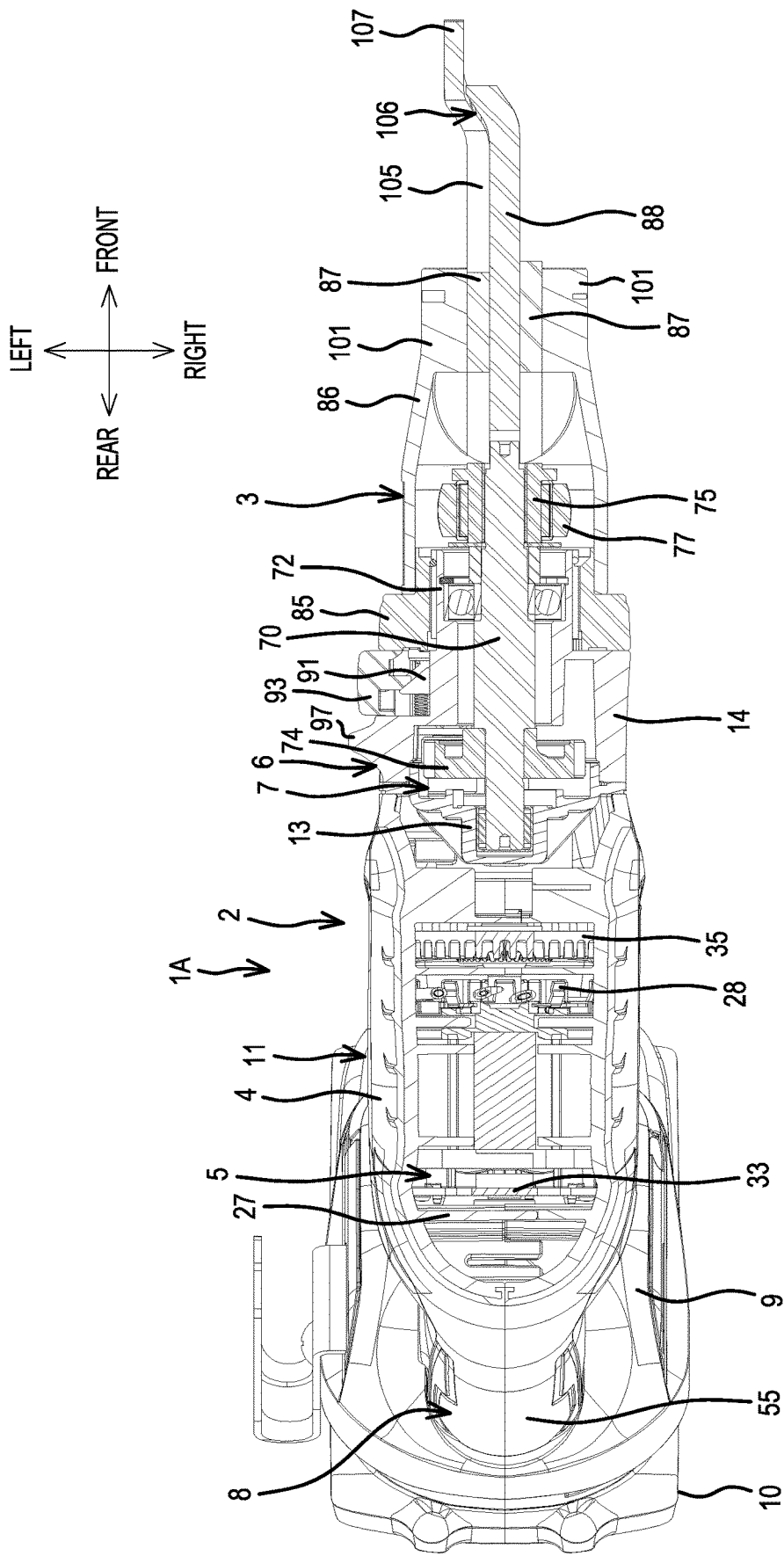
FIG. 11 is a cross-sectional view taken along line B-B in FIG. 10.
Figure 12:
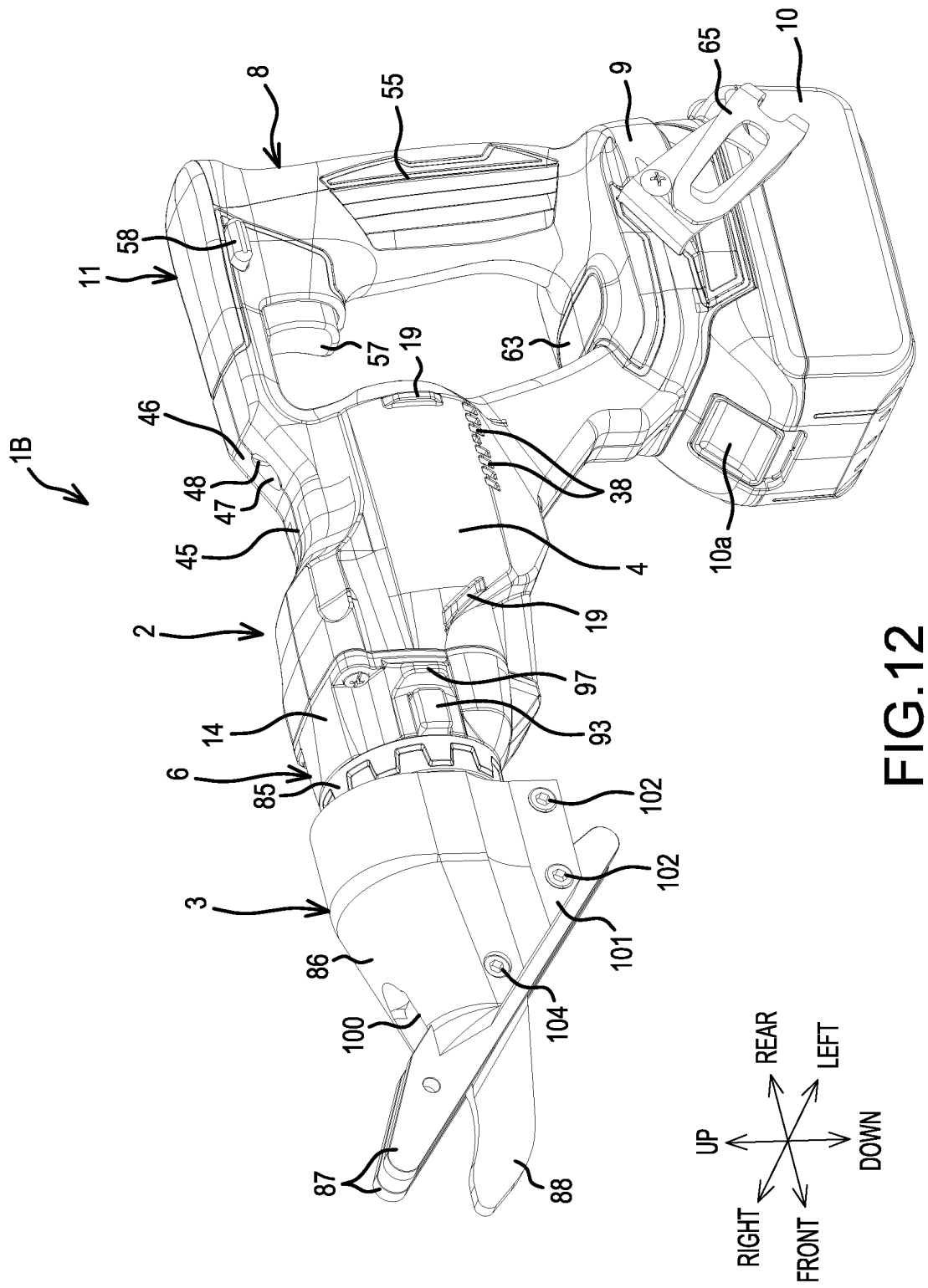
FIG. 12 is an oblique view, viewed from the front left side, of the rechargeable shear according to a third embodiment.
Figure 13:
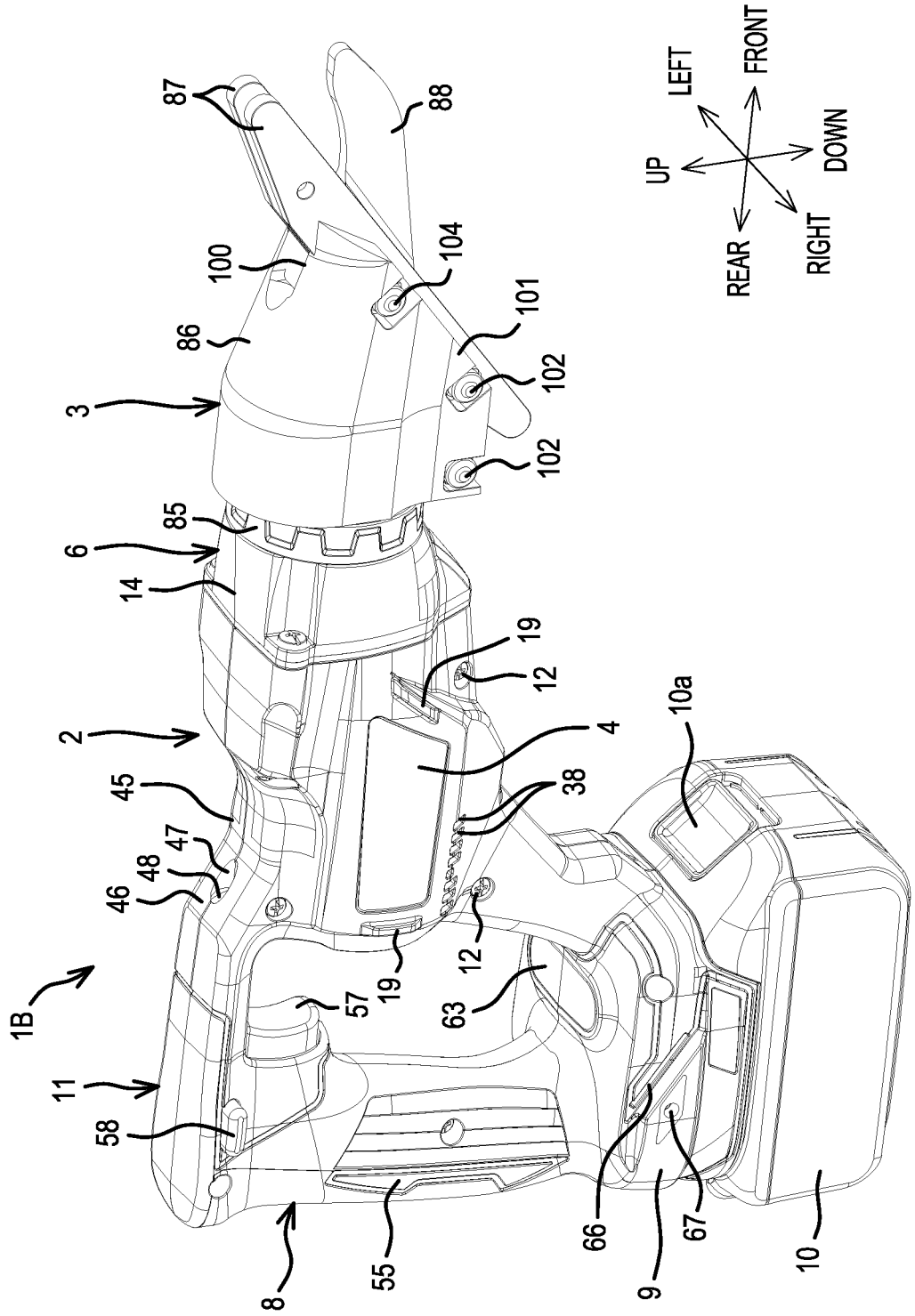
FIG. 13 is an oblique view, viewed from the front right side, of the rechargeable shear according to the third embodiment.
Figure 14:
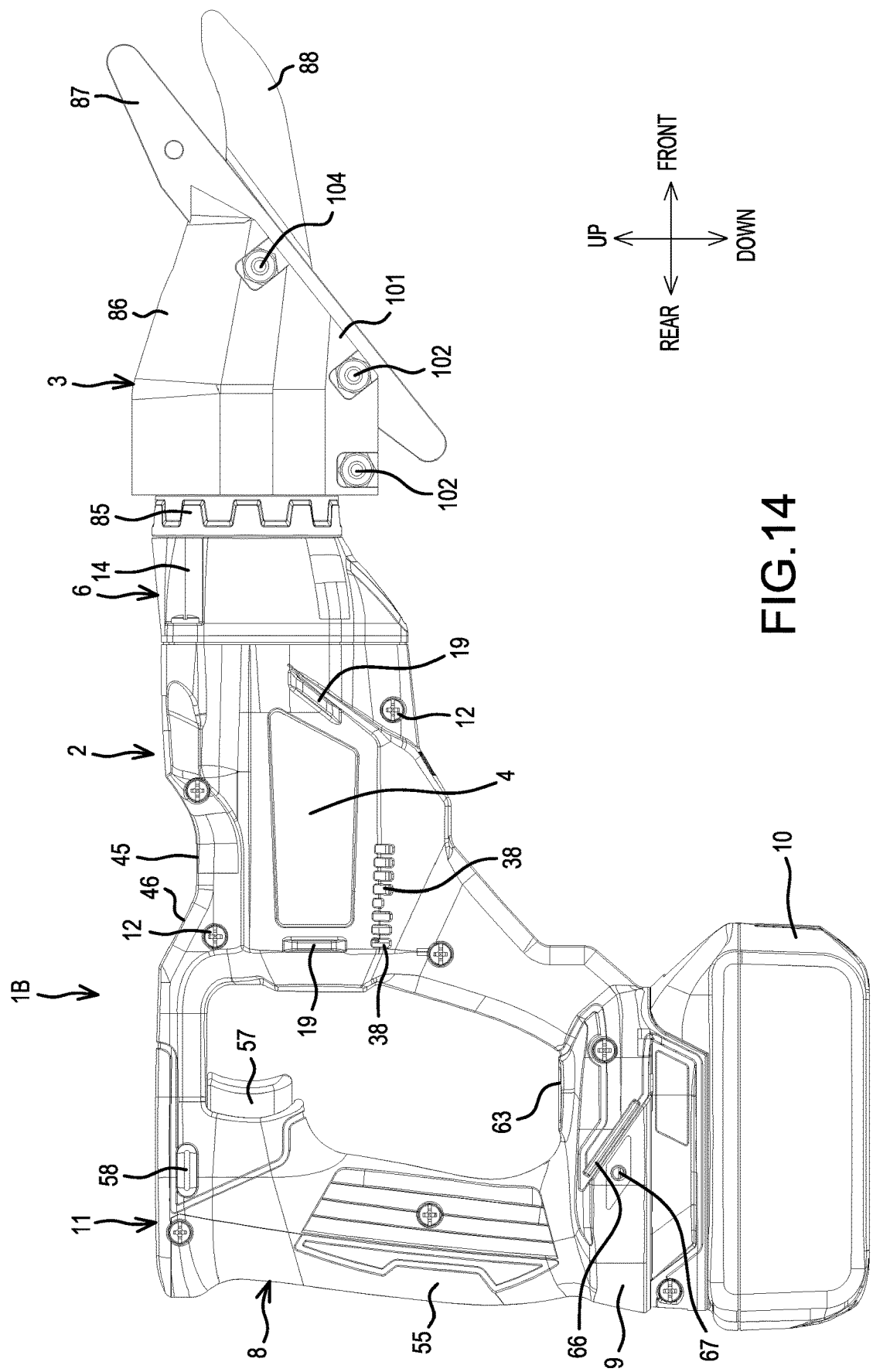
FIG. 14 is a side view, viewed from the right, of the rechargeable shear according to the third embodiment.
Figure 15:
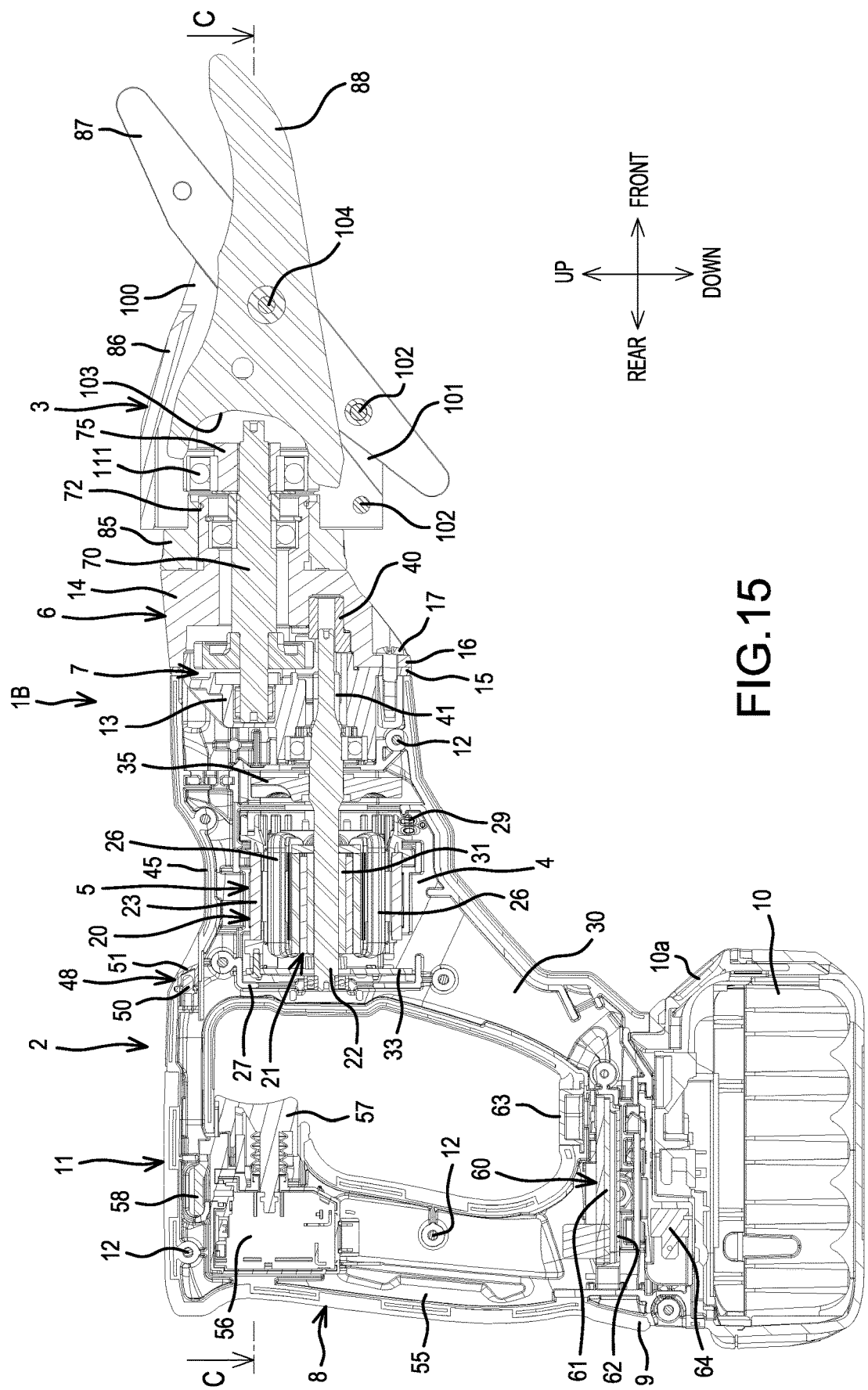
FIG. 15 is a center longitudinal-cross-sectional view of the rechargeable shear according to the third embodiment.
Figure 16:
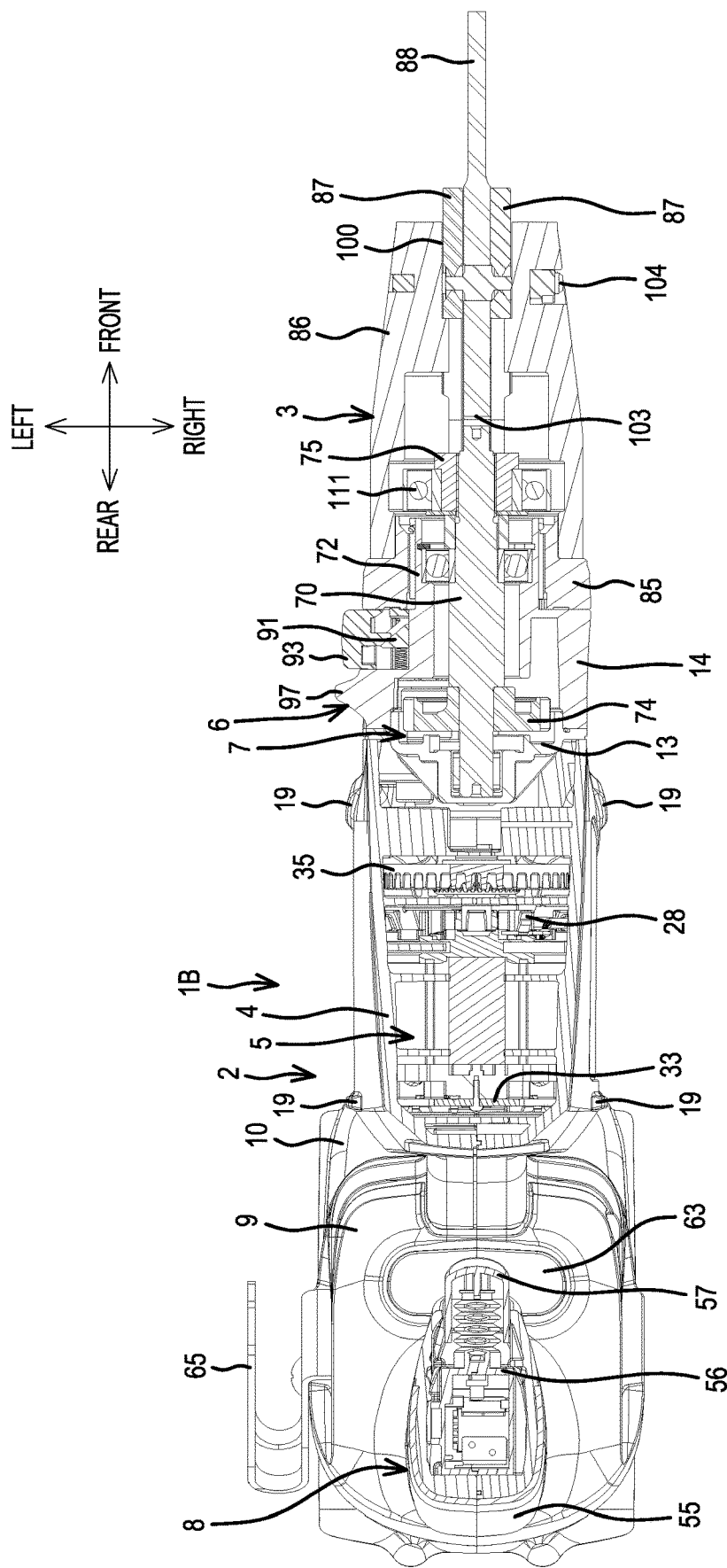
FIG. 16 is a cross-sectional view taken along line C-C in FIG. 15.

Referring now to FIGS. 4-6, the brushless motor 5 is an inner-rotor type that comprises a stator 20 and a rotor 21. The motor 5 is housed inside the motor housing 4 and is oriented such that a rotary shaft 22, which is provided in the rotor 21, extends in the front-rear direction.

The stator 20 comprises: a stator core 23, which is composed of a plurality of layers of steel plates; a front-insulating member 24 and a rear-insulating member 25, which are respectively provided on the front and rear of the stator core 23; and coils 26, which are wound through the front-insulating member 24 and the rear-insulating member 25 and around the stator core 23. The stator 20 is retained by a not-shown retaining part, which is provided on inner surfaces of the half housings 11a, 11b, on inner sides of ribs 27, 27, which have a quadrangular shape in side view and extend, opposing one another, to inner surfaces of the half housings 11a, 11b. Fusing terminals 28 (FIG. 5), which fuse wires of the coils 26, are provided on the front-insulating member 24. A three-phase power-supply line 29 is electrically connected to the fusing terminals 28 and is routed through openings, which are provided on lower parts of the ribs 27. Thereafter, the power-supply line 29 passes through the interior of a lower-side tilted part 30 and is connected to a control circuit board 61 inside a controller 60, which is described below. The lower-side tilted part 30 connects the motor housing 4 and the battery-holding housing 9 on a front-lower side of the grip housing 8 and is tilted such that it is lower in the rear.

The rotor 21 comprises: a rotary shaft 22, which is located at the axial center of the rotor 21; a tube-shaped rotor core 31, which is disposed around the rotary shaft 22 and is composed of a plurality of layers of steel plates; and permanent magnets 32, which are disposed in the interior of the rotor core 31. A sensor circuit board 33, on which three rotation-detection devices (not shown) that detect the locations of the permanent magnets 32 and output rotation-detection signals are installed, is fixed, from the rear, by screws. The sensor circuit board 33 extends orthogonal to the rotary shaft 22. Signal lines (not shown), which output the rotation-detection signals, are connected to a lower end of the sensor circuit board 33. These signal lines are also routed through the openings on the lower sides of the ribs 27, the same as the power-supply line 29, after which they pass through the interior of the lower-side tilted part 30 and are connected to the control circuit board 61.

A rear bearing 34 axially supports the rear end of the rotary shaft 22 and is held by rear parts of the ribs 27. A fan housing chamber 36 is defined on the front side of the motor 5 and inward of the ribs 27. The housing chamber 36 houses a centrifugal fan 35, which is for cooling the motor and is mounted on the rotary shaft 22 forward of the stator 20. On the lower side of the fan housing chamber 36, a plurality of air-exhaust ports 37, (FIG. 5), which are arranged in a circumferential direction, is formed in a lower surface of the motor housing 4. On the left and right outer sides of the lower part of the stator 20, a plurality of air-suction ports 38 is formed in the side surfaces of the motor housing 4. The air-suction ports 38 are arranged in a straight line along the front-rear direction.

A front part of the rotary shaft 22 passes through the ribs 27, protrudes forward, and is supported by a front bearing 39, which is held by the inner housing 13. The front end of the rotary shaft 22, which protrudes into the inner housing 13, is supported by a sleeve 40, which is held by the outer housing 14. Between the front bearing 39 and the sleeve 40, a pinion 41 is formed on the rotary shaft 22.

A hollow part 45, in which the front and rear are tilted surfaces and the left and right and the upper part are open, is formed on an upper surface of the motor housing 4. In the hollow part 45, a through hole 47, which is oriented in the front-rear direction, is formed in a tilted surface 46, which is on the rear side and is located on the upper surface of the grip housing 8. A light 48 is housed inside the through hole 47. The light 48 comprises at least one LED 50, which is installed on an LED board 49; a lens 51 covers the front side of the LED(s) 50. The light 48 is housed with a forward-facing attitude such that the lens 51 faces forward from the through hole 47. A front surface of the lens 51 is tilted downward toward the front, and the light of the LED 50 can be radiated, above the motor housing 4, forward and diagonally upward. A lead wire from the LED board 49 passes between the ribs 27 and the rear-side inner surface of the motor housing 4 and is connected to the control circuit board 61.

Rearward of the light 48, a grip part (handle) 55, which is oriented in the up-down direction, is formed on the grip housing 8. A switch 56 is housed in an upper end of the grip part 55. A trigger 57 protrudes forward from the switch 56. A forward/reverse-changing button 58 of the brushless motor 5 is provided on an upper side of the switch 56. A lock-ON (trigger-lock) button 59 is provided on a left-side surface of the grip part 55 rearward of the switch 56. The lock-ON button 59 holds (locks) the trigger 57 in the pulled-in state so that the user is not required to continuously press the trigger 57 while performing a cutting (shearing) operation using the shear 1.

Downward of the grip part 55, a controller 60 that holds the control circuit board 61, whereon a microcontroller, a switching device, and the like are installed, inside a case 62 is housed, such that it extends in the front-rear direction, in a lower end of the grip housing 8. A display operation part 63 is provided on the control circuit board 61 and is exposed at (on) an inner bottom surface inside the loop of the grip housing 8. The display operation part 63 is configured to be manually operated to: (i) display the remaining charge of the battery pack 10, (ii) display the rotational speed of the brushless motor 5, (iii) change the rotational speed of the brushless motor 5, and (iv) turn the light 48 ON and OFF.

In addition, inside the battery-holding housing 9 downward of the controller 60, a terminal block 64, to which the battery pack 10 is electrically connected, is held parallel to the controller 60. Mounting parts (a latching groove 66 that latches an upper end of a hook 65, and screw holes 67 for screw fastening) of the hook 65 for hanging the shear are respectively provided on the left and right side surfaces of the battery-holding housing 9. The hook 65 can be mounted on either the left or the right side surface.

Turning now to the speed-reducing part 7, it includes a spindle 70, which is parallel to and located upward of the rotary shaft 22. A rear end of the spindle 70 is supported by a bearing 71 (a needle bearing) held by the inner housing 13. An intermediate portion of the spindle 70 is supported by a bearing 73 (a ball bearing) held by a tube part 72, which is provided on the front end of the outer housing 14. A front end of the spindle 70, which passes through the tube part 72, protrudes forward. A gear 74, which transmits rotation, via an intermediate shaft (not shown), from the pinion 41 of the rotary shaft 22, is fixed to (at) a rear portion of the spindle 70.

Forward of the tube part 72, an eccentric sleeve 75 is externally mounted, such that it is integrally rotatable with the spindle 70 at a location eccentric to the axis line of the spindle 70, on the front end of the spindle 70. A cam 77 has a spherical outer surface and is externally mounted, such that it is coaxial and rotatable with the eccentric sleeve 75, on the eccentric sleeve 75 via a bearing 76 (a needle bearing). Thereby, when the spindle 70 rotates, the cam 77 (together with the eccentric sleeve 75) moves (rotates) eccentrically about the axis line (center axis or rotational axis) of the spindle 70.

A flange 78 is provided on the front end of the eccentric sleeve 75 and prevents the eccentric sleeve 75 and the cam 77 from slipping forward. A spacer 79 and a washer 80 set the forward position of the eccentric sleeve 75. The spacer 79 has a tube shape and is externally mounted on the spindle 70 forward of the bearing 73, and the washer 80 is disposed forward of the spacer 79. The bearing 73 contacts a step 81, which is formed between an intermediate portion of the spindle 70 having a large diameter and a front-end portion of the spindle 70 having a small diameter, and is positioned rearward of the bearing 73.

The shear part 3 comprises: a manipulatable (manually-rotatable) ring 85, which is rotatably and externally mounted on a base of the tube part 72; a tip holder (cutting head) 86, which is fixed to a front surface of the manipulatable ring 85 and has a tube shape that is tapered forward; a pair of (left and right) fixed blades (side blades) 87 held by the tip holder 86; and a movable blade (center blade) 88, which is provided such that it is capable of oscillating (pivoting back and forth, i.e. up and down) between the fixed blades 87.

As shown in FIG. 6, engaging-recesses 89 are formed, at prescribed spacings (intervals) in the circumferential direction, in the rear surface of the manipulatable ring 85. On the left-side surface of the outer housing 14, a cavity 90 houses: an engaging member (wedge) 91, which is capable of moving forward and rearward relative to a rear surface of the manipulatable ring 85; a coil spring 92, which biases the engaging member 91 forward; and a lock-release button 93. The front side of the engaging member 91 has an engaging projection (detent) 94, which selectively engages with (in) one of the engaging-recesses 89 of the manipulatable ring 85 when the engaging projection 94 is pushed to its advanced (forward-most) position. In the normal state (i.e. when the lock-release button 93 is not being pressed inwardly), the coil spring 92 urges the engaging projection 94 forward into engagement with (in) one of the engaging-recesses 89 and thereby restricts (blocks) the rotation of the manipulatable ring 85 relative to the housing 2.

The lock-release button 93 is provided on a lateral side of the shear 1 and extends inside the cavity 90. The lock-release button 93 is capable of sliding (moving inwardly and outwardly relative to the cavity 90) in the left-right direction of the shear 1. A projection 95 is provided on the inner side of the lock-release button 93 and contacts a tilted guide surface 96, which is provided on an outer side of the engaging member 91 and is tilted toward the right side as it extends in the forward direction.

Because the projection 95 contacts the rear part of the tilted guide surface 96 of the engaging member 91, which is biased toward the advanced position in the normal state, the lock-release button 93 is outwardly biased toward a protruding position at which it protrudes from the cavity 90 toward the left outer side. When the lock-release button 93 is then pressed inwardly into the cavity 90, the engaging member 91 is caused to retract rearwardly against the biasing of the coil spring 92 owing to the projection 95 sliding forward relative to and along the tilted guide surface 96. Thereby, the engaging projection 94 becomes spaced apart (withdraws) from the engaging-recess 89, and it becomes possible for the manipulatable ring 85 to rotate to an arbitrary angle in a rotational direction relative to the housing 2. Thereafter, when the manipulatable ring 85 and thus the shear part 3 are disposed at a selected angle relative to the housing 2 and the lock-release button 93 is released, the manipulatable ring 85 is again restricted (blocked) from rotating relative to the housing 2 by the engaging member 91, which has once again advanced to its advanced (forward-most) position so that the engaging projection 94 engages in (with) the closest one of the engaging recesses 89.

Thus, the engaging recesses 89, the coil spring 92, the lock-release button 93 and engaging projection 94 function together as a detent system that releaseably locks the rotational position of the shear part 3 relative to the housing 2.

A vertically-extending protective rib 97 has a height that is higher than the protrusion height of the lock-release button 93 in the normal state and is disposed on the left-side surface of the outer housing 14 rearward of the lock-release button 93. The protective rib 97 prevents or reduces the likelihood of the lock-release button 93 being unintentionally pressed-in, which would permit rotation of the manipulatable ring 85 relative to the housing 2.

The tip holder (cutting head assembly) 86 will now be described in further detail. The tip holder 86 has a slit (gap) 100, which opens forward in the front-rear direction from the lower surface of the tip holder 86. The fixed blades 87 are fixed by screws 102 to inner surfaces of both right- and left-side support pieces 101 that form the slit 100. The fixed blades 87 are tilted upward from the lower side toward the front side of the slit 100.

The movable blade 88 has an intermediate portion portion that is supported in a rotatable manner between the fixed blades 87 by a bolt 104, which passes through the fixed blades 87 in the left-right direction and spans the support pieces 101 at the front end of the tip holder 86. In addition, the movable blade 88 has a notch 103, which has a semi-circular (spherical) shape and extends forwardly from the rear end of the movable blade 88. The notch 103 mates with the cam 77 that is provided on the front end of the spindle 70. More specifically, the upper and lower inner surfaces of the notch 103 respectively contact the upper and lower circumferential surfaces of the cam 77. Consequently, when the cam 77 moves (rotates) eccentrically, the movable blade 88 oscillates (moves) up and down by the same amount of movement of the cam 77 in the up-down direction. Thus, the shearing (cutting) operation is performed by a tip portion of the movable blade 88 oscillating (moving) up and down, about the bolt 104, between the fixed blades 87.

In the rechargeable shear 1 configured as described above, when the trigger 57 is pulled, the switch 56 turns ON so that an ON signal is transmitted from the battery pack 10 to the control circuit board 61 of the controller 60. The microcontroller of the control circuit board 61 acquires the rotational state of the rotor 21 based on detection signals obtained from the rotation-detection devices of the sensor circuit board 33 and causes the rotor 21 to rotate by turning the switching device provided on the control circuit board 61 ON and OFF in accordance with the acquired rotational state, thereby supplying electric current sequentially to the coils 26, for each phase, of the stator 20.

Thus, when the rotary shaft 22 rotates together with the rotor 21, the spindle 70 rotates (the rotational speed of which is reduced, compared to the rotational speed of the rotary shaft 22, by the pinion 41, the intermediate shaft, and the gear 74), and the eccentric sleeve 75 and the cam 77 are caused to move eccentrically. Consequently, the movable blade 88 oscillates up and down as described above and the workpiece (material) interposed between the fixed blades 87 and the movable blade 88 can be sheared (cut).

At this time, if the light 48 is turned ON by operating (pressing a button on) the display operation part 63, the light radiated from the LED(s) 50 passes by the motor housing 4 and the upper side of the gear housing 6 and irradiates the upper ends of the fixed blades 87 and the movable blade 88 and the vicinity along the extension of the upper side thereof. Therefore, the portion of the workpiece (material) that is being sheared (cut) is illuminated and the cutting can be performed easily even in a dark location.

In addition, when it is desired to change the cutting angle, the lock-release button 93 is pressed, which makes it possible to rotate the tip holder 86 (and thus the fixed blades 87 and the movable blade 88) together with the manipulatable ring 85 relative to the housing 2. Then, by rotating the manipulatable ring 85 and re-imposing the restriction on the rotation of the manipulatable ring 85 by releasing the lock-release button 93, the fixed blades 87 and the movable blade 88 can be fixed at any arbitrary cutting angle relative to the housing 2 so that work efficiency can be improved.

In the above-described embodiment, the rechargeable shear 1 comprises: the brushless motor 5 having the stator 20 and the rotor 21, which is rotatable relative to the stator 20; the motor housing 4, which houses the brushless motor 5; the grip housing 8, which is connected to the motor housing 4; the battery-holding housing 9, which is connected to the grip housing 8; and the shear part 3, which is disposed forward of the rotor 21 and performs the shearing operation by being driven by the rotor 21. Therefore, this embodiment provides satisfactory handling characteristics and high power owing to the brushless motor and cordless design.

In addition, the rechargeable shear 1 of this embodiment comprises: the housing 2; the brushless motor 5 (motor) having the stator 20 and the rotor 21, which is rotatable relative to the stator 20; and the shear part 3, which is disposed forward of the rotor 21 and performs the shearing operation by being driven by the rotor 21. The housing 2 comprises the motor housing 4, which houses the brushless motor 5, the grip housing 8, which is connected to the motor housing 4, and the battery-holding housing 9, which is connected to the grip housing 8. The light 48 for illuminating the shear part 3 is provided on the housing 2. Therefore, in addition to the satisfactory handling characteristics and high power, the portion of the workpiece (material) being sheared by the shear part 3 is illuminated by the light 48, and therefore work efficiency and safety is satisfactory even in a dark location.

Moreover, in the above-described embodiment, the grip housing 8 has a loop shape extending in the up-down direction and the lower end of the loop shape is located downward of the motor housing 4. Therefore, because the light 48 is provided on the upper surface of the grip housing 8, it becomes possible to effectively illuminate the portion of the workpiece being sheared without shadows being formed by the illumination while the shearing (cutting) proceeds along the extension direction of the fixed blades 87.

In addition, because the shear part 3 is rotatable relative to the housing 2 about a front-rear extending axis, and because the shear part 3 is provided such that it is capable of being fixed at any arbitrary rotational position, the shearing (cutting) angle of the shear part 3 can be adjusted (rotated) about the front-rear axis in accordance with the workplace and/or the workpiece, and therefore increased work efficiency can be achieved.

It is noted that the first embodiment described above illustrates a rechargeable shear (also called a "straight shear") in which the fixed blades and the movable blade are oriented in (along) a straight line, but the present disclosure is not limited thereto. Additional embodiments of the present disclosure are explained below wherein structural elements that are the same as those in the first embodiment are assigned the same reference numbers, and redundant explanation is omitted.

Second Embodiment

In the rechargeable shear 1A shown in FIGS. 7-11, the shear part 3 includes a protruding piece 105, which has a longitudinally oriented plate shape that protrudes forward and is integrally formed on the lower side of the fixed blade 87 on the left side. The movable blade 88 also protrudes in a longitudinally oriented plate shape (the same as the protruding piece 105) on the right side upward of the protruding piece 105. A shearing part 106 is formed by bending tip parts of the protruding piece 105 and the movable blade 88 toward the left side, thereby tilting the shearing part 106 toward the left side such that it is offset from a plane defined by the front, rear, up, and down directions. A front end of the protruding piece 105 constitutes a latching part 107, which protrudes upward facing and guides the workpiece to the shearing part 106 on the rear side.

In addition, the grip housing 8 of the second embodiment extends downward from the rear part of the motor housing 4, such that the main body housing 11 has an inverted L shape. The power-supply line 29 and the signal line of the sensor circuit board 33 are routed from the opening provided in the upper part of the ribs 27, pass, from the rear of the ribs 27, through the interior of the grip part 55, and are connected to the control circuit board 61.

Furthermore, the battery-holding housing 9 is again provided on the lower end of the grip housing 8, similar to the first embodiment. However, the display operation part 63 and the light 48 are provided, lined up frontward and rearward, on the upper surface of the battery-holding housing 9, which protrudes forward. The light 48 is provided in a diagonally upward orientation inside a protruding part 110, which is provided such that it protrudes from a front-side upper surface of the battery-holding housing 9. Therefore, the light emitted from the LED 50 can irradiate the shearing part 106 from below.

Thus, in the rechargeable shear 1A according to the second embodiment, too, because the brushless motor 5 is used, the handling characteristics are satisfactory and high power is also obtained. In addition, the shearing angle of the shear part 3 can be adjusted (rotated) about the central longitudinal axis in accordance with the workplace and/or workpiece, thereby providing improved work efficiency.

Furthermore, because the light emitted from the light 48 can irradiate the tip of the shear part 3 from below, the shearing part 106 can be directly illuminated without hindrance by the housing 2 in an advantageous manner.

Third Embodiment

In the rechargeable shear 1B shown in FIGS. 12-16, the fixed blades 87 and the movable blade 88 of the shear part 3 are arranged in a straight line, the same as in the first embodiment. However, both are formed such that they are elongated in the forward direction, and the shear surface is larger (longer) than in the first embodiment. This design is suited to the cutting of a workpiece that has a relatively thick wall thickness, such as a cement board. Therefore, this embodiment may also be called a "cement shear."

In addition, instead of a cam, a ball bearing 111 is externally mounted on the eccentric sleeve 75 in this embodiment. Therefore, the notch 103 of the movable blade 88 mates with the ball bearing 111, and the rear end of the movable blade 88 is capable of oscillating up and down. Other structural elements are the same as those in the first embodiment.

In the rechargeable shear 1B according to the third embodiment, too, because the brushless motor 5 is used, the handling characteristics are satisfactory and high power is also obtained. In addition, because the light 48 is provided on the upper surface of the grip housing 8, the shearing part (cutting head assembly) of the rechargeable shear 1B can be effectively illuminated without shadows being formed by the illumination so that the shearing can proceed along the extension direction of the fixed blades 87.

Furthermore, because the shearing angle of the shear part 3 about the axis can be adjusted (rotated) in accordance with the workplace and/or workpiece, improved work efficiency is achievable.

It is noted that the specific structures of the rechargeable shear in each of the embodiments are not limited to the explanation above. For example, in the rechargeable shears according to the first and third embodiments, too, the grip housing having an inverted L shape according to the second embodiment may be used. Furthermore, in the rechargeable shear according to the second embodiment, too, the loop-shaped grip housing according to the first embodiment may be used.

In addition, in each of the embodiments, it is also possible to provide, instead of the grip housing that extends downward, a grip housing that extends rearward from the motor housing along the extension and to provide the battery-holding housing on the rear end thereof. In such an embodiment, the battery pack is slid upward relative to the battery-holding housing or is slid in the left-right direction.

Furthermore, with regard to the arrangement of the light, in the first and third embodiments, the light may be provided on the front surface or the side surface of a lower-side tilted part of the grip housing, and/or the light may be provided on the battery-holding housing. Likewise, in the second embodiment, the light may be provided on the upper surface of the motor housing, the gear housing, or the like. There would be no problem even if the light were provided on a side surface of the housing, and a plurality of lights may be provided.

In addition, in common with each of the embodiments, the controller may be provided inside the grip part, and the front-rear orientation of the brushless motor may be reversed, with the sensor circuit board at the front and the centrifugal fan at the rear. In addition, the brushless motor can also be disposed such that it is oriented in the up-down direction, a diagonal (oblique) direction, or the like relative to the spindle.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rechargeable (cordless shears).

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS 1, 1A, 1B Rechargeable shear
2 Housing
3 Shear part
4 Motor housing
5 Brushless motor
6 Gear housing
7 Speed-reducing part 8 Grip housing
9 Battery-holding housing
10 Battery pack
11 Main body housing
13 Inner housing
14 Outer housing
20 Stator
21 Rotor
22 Rotary shaft
26 Coil
30 Lower-side tilted part
45 Hollow part
48 Light
49 LED board
50 LED
51 Lens
55 Grip part
60 Controller
61 Control circuit board
70 Spindle
75 Eccentric sleeve
76 Cam
85 Manipulatable (manually-rotatable) ring
86 Tip holder
87 Fixed blade
88 Movable blade
97 Engaging member
93 Lock-release button
103 Notch
104 Bolt
106 Shearing part

We claim:

1. A rechargeable shear comprising:
a brushless motor having a rotor that is rotatable relative to a stator and that rotatably drives a rotary shaft;
a fan disposed on the rotary shaft forward of the rotor;
a sensor circuit board disposed rearward of the rotor;
a housing including:
    a motor housing, which houses the brushless motor;
    a grip housing having a loop shape and being connected to a rear part of the motor housing; and
    a battery-holding housing connected to a lower part of the grip housing;
a shear part disposed forward of the rotor and configured to perform a shearing operation in response to rotation of the rotor;
a control circuit board disposed inside the grip housing and configured to control energization of the brushless motor; and
a light provided on an upper surface of the housing rearward of the fan and oriented to illuminate an upper side of the shear part.

2. The rechargeable shear according to claim 1, wherein the shear part is configured to be rotated about a front-rear extending axis relative to the motor housing and to be releasably fixed at a plurality of different rotational positions relative to the motor housing.

3. The rechargeable shear according to claim 2, further comprising:
a manually-rotatable ring coupled to the shear part so as to rotate therewith, the manually-rotatable ring having a plurality of engaging recesses defined therein and corresponding to the plurality of different rotational positions,
a biasing member urging an engagement projection into engagement with or in one of the plurality of engaging recesses to block rotation of the shear part relative to the motor housing, and
a lock-release button configured to move the engagement projection out of engagement with the engaging recesses to permit rotation of the shear part relative to the motor housing.

4. The rechargeable shear according to claim 1, wherein:
a lower end of the grip housing is located downward of the motor housing; and
the light is provided on an upper surface of the grip housing.

5. The rechargeable shear according to claim 1, wherein the shear part comprises at least one fixed blade in contact with at least one movable blade that oscillates relative to the at least one fixed blade.

6. The rechargeable shear according to claim 5, further comprising:
a spindle, which is rotatably driven by the brushless motor, and
an eccentric cam or a bearing mounted on an end of the spindle, wherein the eccentric cam or the bearing is engaged in a notch in the movable blade and reciprocally drives the movable blade up and down when the spindle rotates.

7. The rechargeable shear according to claim 1, further comprising a rechargeable battery pack mounted on the battery-holding housing.

8. The rechargeable shear according to claim 3, wherein the shear part comprises at least one fixed blade in contact with at least one movable blade that oscillates relative to the at least one fixed blade.

9. The rechargeable shear according to claim 8, further comprising:
a spindle, which is rotatably driven by the brushless motor,
an eccentric cam or a bearing mounted on an end of the spindle, and
a rechargeable battery pack mounted on the battery-holding housing and supplying current to the brushless motor,
wherein the eccentric cam or the bearing is engaged in a notch in the movable blade and reciprocally drives the movable blade up and down when the spindle rotates.

10. A rechargeable shear comprising:
a housing including a motor housing, a grip housing and a battery-holding housing;
a brushless motor disposed in the motor housing and having a rotor that is rotatable relative to a stator;
a shear part disposed forward of the rotor and configured to perform a shearing operation in response to rotation of the rotor; and
a light provided on an upper surface of the housing rearward of a forward end of the brushless motor and oriented to illuminate an upper side of the shear part;
wherein:
the grip housing has a loop shape and is connected to a rear part of the motor housing; and
the battery-holding housing is connected to a lower part of the grip housing.

11. The rechargeable shear according to claim 1, wherein:
air-exhaust ports are defined in the motor housing and extend circumferentially around the fan; and
air-suction ports are defined in the motor housing rearward of the air-exhaust ports.

12. The rechargeable shear according to claim 1, wherein:
the battery-holding housing holds a terminal block configured to be electrically connected to a detachable battery pack;
the grip housing holds a trigger configured to control operation of the brushless motor; and
the control circuit board is disposed between the trigger and the terminal block in an up-down direction.

13. The rechargeable shear according to claim 10, wherein the light includes:
a lens; and
an LED arranged such that light from the LED passes through the lens to be radiated upward.

14. The rechargeable shear according to claim 13, wherein:
the LED is installed on an LED board; and
a control circuit board is disposed in the grip housing and is electrically connected to the LED board by a lead wire.

15. The rechargeable shear according to claim 14, wherein:
a sensor circuit board is disposed rearward of the rotor and downward of the LED board; and
the control circuit board is disposed downward of the sensor circuit board.

16. The rechargeable shear according to claim 15, wherein the light is disposed rearward of the rotor.

17. The rechargeable shear according to claim 10, wherein the light is disposed rearward of the rotor.

18. The rechargeable shear according to claim 1, wherein the light is disposed rearward of the rotor.

19. The rechargeable shear according to claim 1, wherein:
the upper surface of the housing has a hollow part that includes a rear-side tilted surface and a front-side tilted surface, and
the light is arranged such that illumination from the light is directed forward through the rear-side tilted surface.

20. The rechargeable shear according to claim 1, further comprising:
a spindle that is rotatably driven by the rotary shaft;
wherein the spindle is disposed above the rotary shaft and is configured to drive the shear part.

* * * * *